(12) United States Patent
Mitsudera et al.

(10) Patent No.: US 8,314,166 B2
(45) Date of Patent: Nov. 20, 2012

(54) WATERPROOF SHEET

(75) Inventors: Taro Mitsudera, Tokyo (JP); Tadashi Sengoku, Tokyo (JP); Yutaka Yonezawa, Tokyo (JP)

(73) Assignee: Adeka Corporation, Tokyo (JP)

( * ) Notice: Subject to any disclaimer, the term of this patent is extended or adjusted under 35 U.S.C. 154(b) by 527 days.

(21) Appl. No.: 12/280,039

(22) PCT Filed: Feb. 12, 2008

(86) PCT No.: PCT/JP2008/052240
§ 371 (c)(1),
(2), (4) Date: Aug. 20, 2008

(87) PCT Pub. No.: WO2008/117575
PCT Pub. Date: Oct. 2, 2008

(65) Prior Publication Data
US 2010/0168288 A1 Jul. 1, 2010

(30) Foreign Application Priority Data

Mar. 27, 2007 (JP) .................................. 2007-080780

(51) Int. Cl.
*C08K 5/3417* (2006.01)
*C08K 5/3435* (2006.01)
(52) U.S. Cl. ........................... 524/91; 524/102; 524/567
(58) Field of Classification Search .................... 524/91, 524/102, 567
See application file for complete search history.

(56) References Cited

U.S. PATENT DOCUMENTS

| | | | | |
|---|---|---|---|---|
| 5,004,770 A | * | 4/1991 | Cortolano et al. | 524/93 |
| 2009/0111699 A1 | * | 4/2009 | Negishi et al. | 504/361 |
| 2010/0190898 A1 | | 7/2010 | Negishi et al. | |

FOREIGN PATENT DOCUMENTS

| | | |
|---|---|---|
| CN | 1926107 | 3/2007 |
| EP | 1 731 508 | 12/2006 |
| JP | 60-232951 | 11/1985 |
| JP | 4-126747 | 4/1992 |
| JP | 4-131018 | 5/1992 |
| JP | 5-306343 | 11/1993 |
| JP | 10-86295 | 4/1998 |
| JP | 10-139933 | 5/1998 |
| JP | 10-219004 | 8/1998 |
| JP | 11-269335 | 10/1999 |
| JP | 2000-37826 | 2/2000 |
| JP | 2002-356596 | 2/2000 |
| JP | 2006-1963 | 1/2006 |
| WO | WO 2005082852 A1 * | 9/2005 |

OTHER PUBLICATIONS

Machine translation of JP 20020356596 A, translated on Sep. 17, 2010.*
Chinese Official Action—Dec. 14, 2010—200880000065.9.
CN Office Action dated Apr. 13, 2011; Application No. 200880000065.9.
Extended European Search Report issued by the European Patent Office on Nov. 2, 2011 in Counterpart European Application No. 08711104.3, 6 pages.
Capocci, G., "Weatherable Rigid PVC: The Effect of Light and Thermal Stabilizers", Journal of Vinyl Technology, vol. 11, No. 4, Dec. 1989, pp. 195-199, XP002661327.

* cited by examiner

*Primary Examiner* — Nicole M Buie-Hatcher
(74) *Attorney, Agent, or Firm* — Young & Thompson

(57) ABSTRACT

A waterproof sheet comprising a vinyl chloride-based resin composition which comprises 100 parts by weight of a vinyl chloride-based resin (A), 5 to 100 parts by weight of a plasticizer (B), 0.05 to 5 parts by weight of a hindered amine compound (C) represented by the following general formula (I), and 0.05 to 5 parts by weight of a benzotriazole-based ultraviolet light absorber (D) represented by the general formula (II):

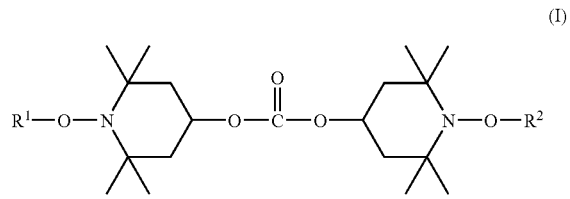

wherein $R^1$ and $R^2$ represent each independently an alkyl group having 4 to 20 carbon atoms or a cycloalkyl group having 5 to 6 carbon atoms;

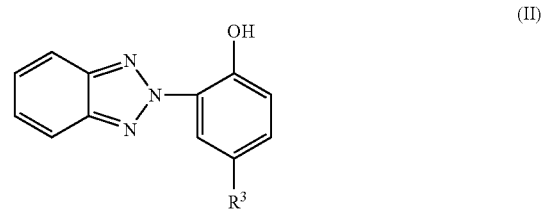

wherein $R^3$ represents an alkyl group having 1 to 12 carbon atoms.

11 Claims, No Drawings

WATERPROOF SHEET

TECHNICAL FIELD

The present invention relates to a waterproof sheet comprising a vinyl chloride-based resin composition. More specifically, the present invention relates to a waterproof sheet with excellent weather resistance, comprising a vinyl chloride-based resin composition formed by blending a hindered amine compound and an ultraviolet light absorber, each having a specific structure.

BACKGROUND ART

As a waterproof sheet installed on a flat roof and the like, one comprising a vinyl chloride-based resin composition composed of a vinyl chloride-based resin, a plasticizer, fillers, and the like is generally used.

With an increasing demand for a house of high durability, the waterproof sheet has also come to be required to have high durability (weather resistance).

The Patent Document 1 discloses a soft polyvinyl chloride resin-based waterproof sheet comprising a polyvinyl chloride resin, a plasticizer, a zinc glycinate, an organic phosphoric acid ester, and titanium dioxide produced by a chloride process. The Patent Document 2 discloses a vinyl chloride-based resin waterproof sheet comprising a vinyl chloride-based resin, a plasticizer, fillers, and basic zinc phosphate or basic zinc phosphite. Both of these inventions show some improvement in weather resistance but were not satisfactory.

Patent Document 1: Japanese Patent Laid-Open Publication No. H5-306343

Patent Document 2: Japanese Patent Laid-Open Publication No. 2006-001963

DISCLOSURE OF THE INVENTION

Problems to be Solved by the Invention

Accordingly, an object of the present invention is to provide a waterproof sheet comprising a vinyl chloride-based resin composition with excellent weather resistance.

Means for Solving the Problems

As a result of intensive studies, the present inventors have found that a waterproof sheet comprising a vinyl chloride-based resin composition formed by blending a vinyl chloride-based resin, a plasticizer, and a specific hindered amine compound and a specific benzotriazole-based ultraviolet light absorber, shows excellent weather resistance.

Namely, the present invention has been completed based on this knowledge and accomplishes the object by providing a waterproof sheet comprising a vinyl chloride-based resin composition which comprises 100 parts by weight of a vinyl chloride-based resin (A), 5 to 100 parts by weight of a plasticizer (B), 0.05 to 5 parts by weight of a hindered amine compound (C) represented by the following general formula (I), and 0.05 to 5 parts by weight of a benzotriazole-based ultraviolet light absorber (D) represented by the following general formula (II):

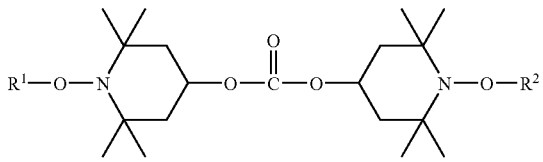

wherein $R^1$ and $R^2$ represent each independently an alkyl group having 4 to 20 carbon atoms or a cycloalkyl group having 5 to 6 carbon atoms;

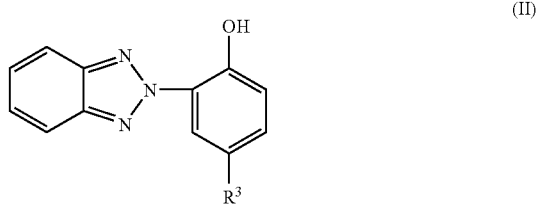

wherein $R^3$ represents an alkyl group having 1 to 12 carbon atoms.

Best Mode for Carrying out the Invention

Hereafter, the waterproof sheet of the present invention comprising a vinyl chloride-based resin composition will be detailed based on the preferable embodiments.

The waterproof sheet of the present invention comprises a vinyl chloride-based resin composition formed by blending 100 parts by weight of a vinyl chloride-based resin (A), 5 to 100 parts by weight of a plasticizer (B), 0.05 to 5 parts by weight of a hindered amine compound (C) represented by the general formula (I), and 0.05 to 5 parts by weight of a benzotriazole-based ultraviolet light absorber (D) represented by the general formula (II).

The vinyl chloride-based resin (A) that can be used in the invention includes any of those produced by any polymerization method such as bulk polymerization, solution polymerization, suspension polymerization, emulsion polymerization, and the like without any particular restriction. Examples of the vinyl chloride-based resin (A) include a chlorine-containing resin such as polyvinyl chloride, chlorinated polyvinyl chloride, polyvinylidene chloride, chlorinated polyethylene, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride terpolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-maleic acid ester copolymer, a vinyl chloride-methacrylic acid ester copolymer, a vinyl chloride-acrylonitrile copolymer, a vinyl chloride-various vinyl ether copolymer, and the like; mutual blends of the polymers; polyblends, block copolymers, and graft copolymers of the polymers with other synthetic polymers which do not contain chlorine atoms, such as an acrylonitrile-styrene copolymer, an ethylene-vinyl acetate copolymer, an ethylene-ethyl (meth)acrylate copolymer, polyester, and the like.

As the plasticizer (B) that can be used in the invention, any plasticizer commonly used for vinyl chloride-based resins may be utilized arbitrarily. Examples of the plasticizer (B) include a phthalic acid ester plasticizer such as dibutyl phthalate, butyl hexyl phthalate, diheptyl phthalate, dioctyl phthalate, di-2-ethylhexyl phthalate, diisononyl phthalate, diisodecyl phthalate, diundecyl phthalate, dilauryl phthalate, ditridecyl phthalate, dioctadecyl phthalate, dicyclohexyl phthalate, dioctyl terephthalate, and the like; an adipic acid ester plasticizer such as dioctyl adipate, diisononyl adipate, diisodecyl adipate, di(butyldiglycol)adipate, and the like; a phosphoric acid ester plasticizer such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate, octyldiphenyl phosphate, phenol/resorcinol polyphosphate, phenol/bisphenol A polyphosphate, and the like; a polyester-based plasticizer prepared from a polyalcohol, a dibasic acid and optionally a monovalent alcohol and/or a monovalent carboxylic acid used as a stopper, wherein the polyalcohol includes ethylene glycol, diethylene glycol, triethylene glycol, 1,2-propylene glycol, 1,3-propylene glycol, 1,3-butanediol, 1,4-butanediol, 2-methyl-1,3-propyleneglycol, 1,5-hexanediol, 1,6-hexanediol, neopentylglycol, glycerin, trimethylolpropane, pentaerythritol, dipentaerythritol, and the like, and the dibasic acid includes oxalic acid, malonic acid, succinic acid, glutaric acid, adipic acid, pimelic acid, suberic acid, azelaic acid, sebacic acid, phthalic acid, isophthalic acid, terephthalic acid, and the like; an epoxidized vegetable oil such as epoxidized soybean oil, epoxidized castor oil, and the like; other plasticizers based on tetrahydrophthalic acid, azelaic acid, sebacic acid, stearic acid, citric acid, trimellitic acid, pyromellitic, acid, and biphenylenepolycarboxylic acid. Among these, phthalic acid ester-based plasticizers such as diisononyl phthalate and diundecyl phthalate, obtained from phthalic acid and an alcohol having 8 to 13 carbon atoms, especially the one having 9 to 11 carbon atoms, are preferably used because they offer a waterproof sheet of excellent weather resistance.

The plasticizer (B) is used in the range of 30 to 100 parts by weight, preferably 40 to 80 pars by weight and especially preferably 45 to 70 parts by weight, per 100 parts by weight of the vinyl chloride-based resin. When its amount is less than 30 parts by weight, a sufficient plasticizing effect is not obtained and, when the amount is more than 100 parts by weight, the mechanical strength of the obtained vinyl chloride-based resin composition may become too low to serve a practical use.

In the hindered amine compound (C) represented by the general formula (I) that can be used in the invention, examples of the alkyl groups represented by $R^1$ and $R^2$ having 4 to 20 carbon atoms include butyl, sec-butyl, tert-butyl, pentyl, hexyl, heptyl, octyl, nonyl, decyl, undecyl, dodecyl, tetradecyl, hexadecyl, and octadecyl. Examples of the cycloalkyl groups having 5 to 6 carbon atoms include cyclopentyl, and cyclohexyl.

Specific examples of the hindered amines (C) include compounds Nos. 1 through 4 shown below, which are given only for illustrative purposes but not for limitation.

Compound No.1

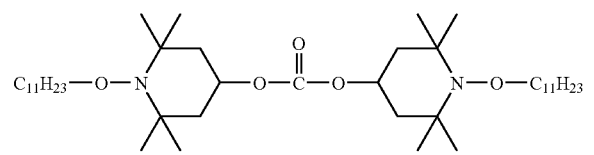

Compound No.2

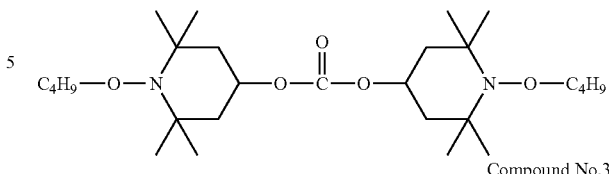

Compound No.3

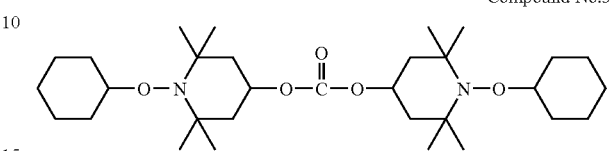

Compound No.4

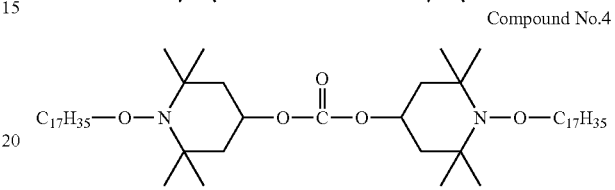

Among the hindered amine compounds (C), preferred is compound No. 1 because it shows excellent weather resistance.

The hindered amine compound (C) is used in the range of 0.05 to 5 parts by weight and preferably 0.1 to 3 parts by weight, per 100 parts by weight of the vinyl chloride-based resin. When its amount is less than 0.05 part by weight, a sufficient stabilizing effect is not obtained and, when its amount is more than 5 parts by weight, the stabilizing effect does not improve as expected, the cost will increase, and bleeding sometimes damages the appearance.

In the benzotriazole-based ultraviolet light absorber (D) represented by the general formula (II) that can be used in the invention, examples of the alkyl group represented by $R^3$ having 1 to 12 carbon atoms include methyl, ethyl, propyl, isopropyl, butyl, sec-butyl, tert-butyl, pentyl, tert-pentyl, hexyl, heptyl, octyl, 1,1,3,3-tetramethylbutyl, nonyl, isononyl, decyl, isodecyl, undecyl, and dodecyl.

Examples of the benzotriazole-based ultraviolet light absorber (D) include 2-(2-hydroxy-5-methylphenyl)benzotriazole, 2-(2-hydroxy-5-tert-butylphenyl)benzotriazole, 2-(2-hydroxy-5-(1,1,3,3-tetramethylbutyl)phenyl)benzotriazole, and the like. Among these, 2-(2-hydroxy-5-(1,1,3,3-tetramethylbutyl)phenyl)benzotriazole is preferable because of its excellent compatibility with the resin and volatility resistance.

The benzotriazole-based ultraviolet light absorber (D) is used in the range of 0.05 to 5 parts by weight and preferably 0.1 to 3 parts by weight, per 100 parts by weight of the vinyl chloride-based resin. When its amount is less than 0.05 part by weight, a sufficient stabilizing effect is not obtained and, when its amount is more than 5 parts by weight, the stabilizing effect does not improve as expected, the cost will increase, and bleeding sometimes damages the appearance.

The vinyl chloride-based resin composition of the invention, may further contain, according to necessity, any additives that are commonly added to vinyl chloride-based resin. Examples of the additives include a metal salt compound such as a barium/zinc-based stabilizer, a calcium/zinc-based stabilizer, a tin-based stabilizer, a lead-based stabilizer, and the like; hydrotalcite compounds; (β-diketone compounds; perchlorates; organic phosphite compounds; phenol-based or sulfur-based antioxidants; epoxy compounds; polyol compounds; other hindered amine compounds; other ultraviolet light absorbers; fillers; and stabilizer aids.

Examples of the metal salt compounds include an organic carboxylate such as a stearate, a laurate, an oleate, a maleate, a benzoate, and the like; phosphoric acid ester salts such as a stearylphosphoric acid salt, a distearylphosphoric acid salt, a phenylphosphoric acid salt, a diphenylphosphoric acid salt, and the like, and basic salts of these; carbonic acid salts, sulfuric acid salts, and basic salts of these; metal oxides; and metal hydroxides. These may be used singly, as mixtures, or, in some cases, as compounds.

As the hydrotalcite compounds, preferably used are complex salt compounds, represented by the following general formula (III), such as one composed of magnesium and aluminum, or one composed of magnesium, zinc and aluminum. They may be ones from which crystal water is removed:

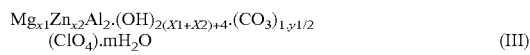

$$Mg_{x1}Zn_{x2}Al_2.(OH)_{2(x1+x2)+4}.(CO_3)_{1-y1/2}(ClO_4).mH_2O \quad \text{(III)}$$

wherein $x1$, $x2$, and $y1$ each represent a number satisfying the conditions shown by the following equations, and m is 0 or an arbitrary integer; $0 \leq x2/x1 \leq 10$, $2 \leq x1+x2 < 20$, $0 \leq y1 \leq 2$.

The hydrotalcite compound may either be a natural product or a synthesized product. As examples of synthetic methods of the synthesized products, there may be cited known synthetic methods disclosed in Japanese Examined Patent Application Publication Nos. S46-2280, S50-30039, S51-29129, H3-36839 and Japanese Patent Unexamined Publication Nos. S61-174270, 2001-164042, 2002-53722, and the like. Further, in the present invention, the hydrotalcite compounds may be used without any restriction by its crystal structure, crystal particle size, and the like. The residual amount of heavy metals such as iron and the like, contained in the raw materials, is preferably small within a practical treatment cost.

Further, as the hydrotalcite compounds, there may also be used one, the surface of which is coated with a higher fatty acid such as stearic acid; a fatty acid metal salt such as an alkali metal oleate; an organic sulfonic acid metal salt such as an alkali metal dodecylbenzene sulfonate; a higher fatty acid amide, a higher fatty acid ester, wax, and the like.

Examples of the β-diketone compounds include acetylacetone, triacetylmethane, 2,4,6-heptatrione, butanoylacetylmethane, lauroylacetylmethane, palmitoylacetylmethane, stearoylacetylmethane, phenylacetylacetylmethane, dicyclohexylcarbonylmethane, benzoylformylmethane, benzoylacetylmethane, dibenzoylmethane, octylbenzoylmethane, bis(4-octylbenzoyl)methane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, cyclohexane-1,3-dione, methyl 3,6-dimethyl-2,4-dioxycyclohexane-1-carboxylate, 2-acetylcyclohexanone, dimedone, and 2-benzoylcyclohexane. Metal salts of these diketone compounds may also be used. Examples of the metal which can afford such β-diketone metal salts include alkali metals such as lithium, sodium, potassium, and the like; alkaline earth metals such as magnesium, calcium, strontium, barium, and the like; zinc, aluminum, tin, alkyl tin and the like.

Examples of the perchloric acid salts include sodium perchlorate, potassium perchlorate, barium perchlorate, and ammonium perchlorate.

Examples of the organic phosphite compounds include triphenyl phosphite, tris(2,4-di-tert-butylphenyl)phosphite, tris(nonylphenyl)phosphite, tris(dinoylphenyl)phosphite, tris (mono/di-mixed nonylphenyl) phosphite, diphenyl acid phosphite, 2,2'-methylenebis(4,6-di-tert-butylphenyl)-2-ethylhexyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentylglycol)-1,4-cyclohexanedimethyl diphosphite, bis(2,4-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearylpentaerythritol diphosphite, hydrogenated-4,4'-isopropylidenediphenol polyphosphite, tetra($C_{12-15}$ mixed alkyl)-4,4'-isopropylidenediphenol diphosphite, tetratridecyl-4,4'-butylidenebis(2-tert-butyl-5-methylphenol)diphosphite, hexa(tridecyl)-1,1,3-tris(2-methyl-5-tert-butyl-4-hydroxyphenyl)butane triphosphite, 9,10-dihydro-9-oxa-10-phosphaphenanthrene-10-oxide, and 2-butyl-2-ethyl-1,3-propanediol-2,4,6-tri-tert-butylphenol monophosphite.

Examples of the phenol-based antioxidants include 2,6-di-tert-butyl-4-methylphenol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, thiodiethylenebis[(3,5-di-tert-butyl-4-hydroxyphenyl)propionate], 4,4'-thiobis(2-tert-butyl-5-methylphenol), 2-methyl-4,6-bis(octylthiomethyl)phenol, 2-(3,5-di-tert-butyl-4-hydroxyphenyl)amino-4,6-bis(octylthio)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(5-tert-butyl-4-hydroxy-2-methylphenyl), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl) propionyloxyethyl]isocyanurate, tetrakis [3-(3,5-di-tert-butyl-4-hydroxyphenyl)propionyloxymethyl]methane, 2-tert-butyl-4-methyl-6-(2-acryloyloxy-3-tert-butyl-5-methylbenzyl)phenol, 2-tert-amyl-4-methyl-6-[1-(2-acryloyloxy-3-tert-amyl-5-methylphenyl)ethyl]phenol, 3,9-bis[2-[3-(3-tert-butyl-4-hydroxy-5-methylphenyl)propanoyloxy]-1,1-dimethyl ethyl]-2,4,8,10-tetraoxaspiro[5.5]undecane-bis, and triethylene glycol bis[3-(3-tert-butyl-4-hydroxy-5-methylphenyepropionate].

Examples of the sulfur antioxidants include dialkyl thiodipropionates such as dilauryl thiodipropionate, dimyristyl thiodipropionate, distearyl thiodipropionate, myristylstearyl thiodipropionate, and the like; β-alkylmercaptopropionic acid esters of polyols such as pentaerythritol tetra(3-dodecylmercaptopropionate) and the like.

Examples of the epoxy compounds include epoxidized animal and plant oils such as epoxidized soybean oil, epoxidized linseed oil, epoxidized wood oil, epoxidized fish oil, epoxidized beef tallow oil, epoxidized castor oil, epoxidized safflower oil, and the like; epoxidized compounds such as epoxidized methyl stearate, epoxidized butyl stearate, epoxidized 2-ethylhexyl stearate, epoxidized stearyl stearate, epoxidized polybutadiene, tris(epoxypropyl)isocyanurate, epoxidized tall oil fatty acid ester, epoxidized linseed oil fatty acid ester, bisphenol A diglycidyl ether, vinylcyclohexene diepoxide, dicyclohexene diepoxide, and 3,4-epoxycyclohexylmethyl-3,4-epoxycyclohexane carboxylate.

Examples of the polyol compounds include trimethylolpropane, ditrimethylolpropane, glycerin, pentaerythritol, dipentaerythritol, polypentaerythritol; partial esters of these polyols with fatty acids such as stearic acid; bis(dipentaerythritol)adipate; tris(2-hydroxyethyl)isocyanurate, and the like.

Examples of the other hindered amine compounds include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl-1,2,3,4-butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetrazaadodecane, 1,6,11-tris[2,4-bis(N-butyl-N-(2,2,6,6-tetramethyl-4-piperidyl)amino)-s-triazin-6-yl amino]undecane, 1,6,11-tris[2,4-bis(N-butyl-N-(1,2,2,6,6-pentamethyl-4-piperidyl)amino)-s-triazin-6-ylamino]undecane, and 3,9-bis[1,1-dimethyl-2-[tris(1,2,2,6,6-pentamethyl-4-piperidyloxycarbonyl)butylcarbonyloxy]ethyl]-2,4,8,10-tetraoxaspiro[5.5]undecane.

Examples of the ultraviolet light absorbers include 2-hydroxybenzophenones such as 2,4-dihydroxybenzophenone, 2-hydroxy-4-methoxybenzophenone, 2-hydroxy-4-octoxybenzophenone, 5,5'-methylenebis(2-hydroxy-4-methoxybenzophenone), and the like; benzoates such as phenyl salicylate, resorcinol monobenzoate, 2,4-di-tert-butylphenyl 3,5-di-tert-butyl-4-hydroxybenzoate, 2,4-di-tert-amylphenyl 3,5-di-tert-butyl-4-hydroxybenzoate, hexadecyl 3,5-di-tert-butyl-4-hydroxybenzoate, and the like; substituted oxanilides such as 2-ethyl-2'-ethoxyoxanilide, 2-ethoxy-4'-dodecyloxanilide, and the like; cyanoacrylates such as ethyl-α-cyano-β, β-diphenyl acrylate, methyl-2-cyano-3-methyl-3-(p-methoxyphenyl) and the like; triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, 2-(2-hydroxy-4-propoxy-5-methylphenyl)-4,6-bis(2,4-di-tert-butylphenyl)-s-triazine, 2-(2-hydroxy-4-(2-ethylhexanoyloxy)ethoxyphenyl)-4,6-diphenyl-s-triazine, and the like; benzotriazole-based ultraviolet light absorbers, which do not correspond to the general formula (II), such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolyl)phenol, and the like.

Examples of the fillers include calcium carbonate (heavy, light, precipitated), gypsum, titanium dioxide, barium sulfate, alumina, hydrocalumite, sodium silicate, aluminum silicate, magnesium silicate, calcium silicate, zeolite, silica rock, diatomite, activated clay, talc, mica, clay, red iron oxide, rock wool, graphite, and carbon black. Among these, use of calcium carbonate is especially preferable because it has little negative effect on the weather resistance of a vinyl chloride-based resin.

Examples of the stabilizer aids, there may be mentioned, for example, diphenylthiourea, anilinodithiotriazine, melamine, benzoic acid, cinnamic acid, p-tert-butylbenzoic acid, anhydrous silicic acid, silicates, and zeolite.

Further, to the waterproof sheet of the present invention comprising a vinyl chloride-based resin composition, there may also be added, according to necessity, optional additives such as a crosslinking agent, an antistatic agent, a foaming agent, an anti-fogging agent, an anti-plateout agent, a surface treating agent, a lubricating agent, a flame retardant, a fungicide, an antibacterial agent, a germicide, a fluorescence agent, a pigment, a metal inactivator, a release agent, a processing agent, and the like.

Even though the amount of the other additives added may be chosen suitably according to the kind of the additives and the like, the total amount is preferably 50 parts by weight or less per 100 parts by weight of the vinyl chloride-based resin.

The waterproof sheet of the present invention comprising a vinyl chloride-based resin composition may be produced without any restriction by heretofore known processes for producing vinyl chloride-based resin waterproof sheets.

The waterproof sheet of the present invention may be used suitably as a waterproof sheet mainly for flat roofs and the like.

EXAMPLES

Hereafter, the waterproof sheet of the present invention will be described in detail by Examples and Comparative Examples. However, the present invention is not limited by these Examples and the like.

In addition, the following Example 1 shows an example of the waterproof sheet comprising the vinyl chloride-based resin composition according to the present invention. And the following Comparative Examples 1 to 5 show examples of waterproof sheets comprising vinyl chloride-based resin compositions composed of hindered amine compounds and/or benzotriazole-based ultraviolet light absorbers that are different from those of the vinyl chloride-based resin composition according to the present invention.

Example 1 and Comparative Examples 1 to 5

To 100 parts by weight of vinyl chloride resin (A) (average degree of polymerization, 1000) were added 62 parts by weight of diisononyl phthalate (B), 5 parts by weight of calcium carbonate, 5 parts by weight of titanium dioxide, 2 parts by weight of a bisphenol A-type epoxy resin, 2 parts by weight of hydrotalcite, 1 part by weight of zinc stearate, 0.1 part by weight of a β-diketone, 1 part by weight of an alkyl phosphate, 0.5 part by weight of dipropylene glycolbis (diphenylphosphite), and anti-weathering agents listed in Table 1. The resultant mixture was roll-kneaded for 7 minutes at 180° C. and was fabricated into sheets of 0.7 mm thickness. These were stuck together and pressed for 5 minutes at 180° C. to give sheets of 1 mm thickness. Weather resistance of the sheets obtained was evaluated with a Metal Weather tester (manufactured by Daipla Wintes Co., Ltd.; Test conditions: Irradiation, Light only; BP, 63° C.; Humidity, 50% RH; Water spray for 120 seconds during Light irradiation for 2 hrs.) by measuring the time until the sheet surface turned yellow, which was regarded as a measure of the weather resistance. The results of the evaluation are shown in the following Table 1.

TABLE 1

|  |  | Example 1 | Comparative Example 1 | Comparative Example 2 | Comparative Example 3 | Comparative Example 4 | Comparative Example 5 |
|---|---|---|---|---|---|---|---|
| Anti-weathering agent (parts by weight) | Compound No. 1 (C) | 0.5 | 1.0 | — | 0.5 | — | — |
|  | Comparison HALS*1 | — | — | — | — | 0.5 | — |
|  | UVA-1 (D)*2 | 0.5 | — | 1.0 | — | 0.5 | — |
|  | Comparison HALS*3 | — | — | — | 0.5 | — | — |
| Weather resistance (h) |  | 624 | 456 | 408 | 576 | 552 | 72 |

*1 Bis(1-octoxy-2,2,6,6-tetramethylpiperidyl-4-yl) sebacate
*2 2-(2-hydroxy-5-(1,1,3,3-tetramethylbutyl)phenyl)benzotriazole
*3 2-(2-hydroxy-3,5-di-tert-butylphenyl)-5-chlorobenzotriazole From the results of Example 1 and Comparative Examples 1 to 5, the followings are clear. In a case of a vinyl chloride resin without use of an anti-weathering agent (Comparative Example 5), the weather resistance of the sheet obtained was quite unsatisfactory. Also, in a case where only a specific hindered amine compound (C) according to the present invention was used (Comparative Example 1), in a case where only a specific benzotriazole (D) according to the present invention was added (Comparative Example 2), in a case where a specific hindered amine compound (C) according to the present invention and a benzotriazole compound different from the specific one (D) according to the present invention were used together (Comparative Example 3), and in a case where a hindered amine compound which is different from the specific one (C) according to the present invention and a benzotriazole compound (D) according to the present invention were used together (Comparative Example 4), all sheets obtained showed unsatisfactory weather resistance.

In contrast, when a specific hindered amine (C) according to the present invention and a specific benzotriazole (D) according to the present invention were used together for the vinyl chloride resin (Example 1), a substantial improvement in weather resistance of the obtained sheet was observed.

INDUSTRIAL APPLICABILITY

The waterproof sheet of the present invention exhibits excellent weather resistance and can be suitably used as a waterproof sheet for a flat roof and the like.

The invention claimed is:

1. A waterproof sheet comprising:
   100 parts by weight of a vinyl chloride homopolymer-based resin (A),
   5 to 100 parts by weight of a diisononyl phthalate plasticizer (B),
   0.05 to 5 parts by weight of a hindered amine compound (C) represented by formula (I), and
   0,05 to 5 parts by weight of a benzotriazole-based ultraviolet light absorber (D) represented by formula (II):

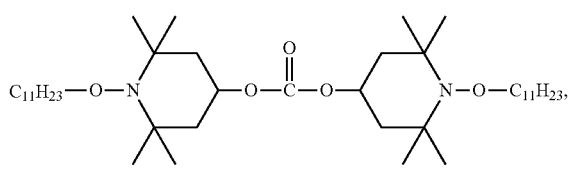

(I)

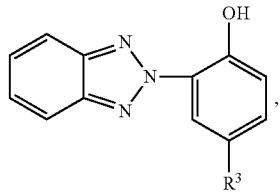

(II)

wherein $R^3$ is a 1,1,3,3-tetramethylbutyl group.

2. The waterproof sheet according to claim 1, comprising 30 to 100 parts by weight of the diisononyl phthalate (B).

3. The waterproof sheet according to claim 1, comprising 45 to 70 parts by weight of the diisononyl phthalate (B).

4. The waterproof sheet according to claim 1, comprising 0.1 to 3 parts by weight of the hindered amine (C).

5. The waterproof sheet according to claim 1, comprising 0.1 to 3 parts by weight of the benzotriazole-based ultraviolet light absorber (D).

6. The waterproof sheet according to claim 1, further comprising a metal salt compound selected from the group consisting of: a barium/zinc-based stabilizer, a calcium/zinc-based stabilizer, a tin-based stabilizer, and a lead-based stabilizer.

7. The waterproof sheet according to claim 1, further comprising an additive selected from the group consisting of: hydrotalcite compounds, β-diketone compounds, perchlorates, organic phosphite compounds, phenol-based or sulfur-based antioxidants, epoxy compounds and polyol compounds.

8. The waterproof sheet according to claim 1, further comprising a filler selected from the group consisting of: heavy calcium carbonate, light calcium carbonate, precipitated calcium carbonate, gypsum, titanium dioxide, barium sulfate, alumina, hydrocalumite, sodium silicate, aluminum silicate, magnesium silicate, calcium silicate, zeolite, silica rock, diatomite, activated clay, talc, mica, clay, red iron oxide, rock wool, graphite, and carbon black.

9. The waterproof sheet according to claim 1, further comprising a stabilizer aid selected from the group consisting of: diphenylthiourea, anilinodithiotriazine, melamine, benzoic acid, cinnamic acid, p-tert-butylbenzoic acid, anhydrous silicic acid, silicates, and zeolite.

10. The waterproof sheet according to claim 1, further comprising: calcium carbonate, titanium dioxide, bisphenol A-type epoxy resin, hydrotalcite, zinc stearate, β-diketone, alkyl phosphate and dipropylene glycolbis(diphenylphosphite).

11. The waterproof sheet according to claim 1, comprising:
   100 parts by weight of the vinyl chloride homopolymer-based resin (A),
   62 parts by weight of diisononyl phthalate (B),
   5 parts by weight of calcium carbonate,
   5 parts by weight of titanium dioxide,
   2 parts by weight of a bisphenol A-type epoxy resin,
   2 parts by weight of hydrotalcite,
   1 part by weight of zinc stearate,
   0.1 part by weight of a β-diketone,
   1 part by weight of an alkyl phosphate,
   0.5 parts by weight of dipropylene glycolbis(diphenylphosphite),
   0.5 parts by weight of the hindered amine compound (C) represented by formula (I), and
   0.5 parts by weight of the benzotriazole-based ultraviolet light absorber (D) represented by formula (II).

* * * * *